（12) United States Patent
Sasaki et al.

(10) Patent No.: US 9,090,226 B2
(45) Date of Patent: Jul. 28, 2015

(54) WEBBING TAKE-UP DEVICE

(75) Inventors: Nao Sasaki, Aichi-ken (JP); Tomotaka Suzuki, Aichi-ken (JP); Takahiro Hamada, Aichi-ken (JP); Takahiro Osaki, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 1002 days.

(21) Appl. No.: 13/158,712

(22) Filed: Jun. 13, 2011

(65) Prior Publication Data

US 2011/0309180 A1    Dec. 22, 2011

(30) Foreign Application Priority Data

Jun. 16, 2010   (JP) ................................ 2010-137380

(51) Int. Cl.
*B60R 22/28*    (2006.01)
*B60R 22/34*    (2006.01)
*B60R 22/405*   (2006.01)

(52) U.S. Cl.
CPC ........... *B60R 22/3413* (2013.01); *B60R 22/405* (2013.01); *B60R 2022/287* (2013.01)

(58) Field of Classification Search
CPC .. B60R 22/34; B60R 22/341; B60R 22/3413; B60R 22/4671; B60R 2022/287
USPC ............ 242/375, 375.2, 379.1; 280/805, 807; 297/471, 472, 475–478
See application file for complete search history.

(56) References Cited

U.S. PATENT DOCUMENTS 4,159,809 A * 7/1979 Rawson ..................... 242/375.2
4,210,296 A * 7/1980 Frechette ...................... 242/410

(Continued)

FOREIGN PATENT DOCUMENTS

EP    1180457        2/2002
EP    1180457 A2     2/2002

(Continued)

OTHER PUBLICATIONS

Japanese Office Action Patent Application No. 2010-137380 mailed Aug. 27, 2013 and English Translation of the Notice of Reasons for Rejection.

(Continued)

*Primary Examiner* — Emmanuel M Marcelo
*Assistant Examiner* — Justin Stefanon
(74) *Attorney, Agent, or Firm* — Roberts Mlotkowski Safran & Cole P.C.

(57) ABSTRACT

When an attempt is made to insert a fitting-shaft section into a fitting-hole section where phases of the fitting-shaft section of a spring-screw and the fitting-hole section of an adapter about a central-axis line of a spool-body are not matched, shaft-section-side inclined-surfaces formed at shaft-section-side protrusions abut to hole-section-side inclined-surfaces formed at hole-section-side protrusions, so the shaft-section-side inclined-surfaces press the hole-section-side inclined-surfaces in such a direction inclined in a pull-out direction to a projecting-direction of a shaft-section body from a flange section. The adapter upon receiving a pressing force generated by this pressing at the hole-section-side inclined-surfaces rotates in the pull-out direction, thereby aligning phases of the fitting-hole section and the fitting-shaft section about the central-axis line such that each shaft-section-side protrusion inserts into a gap between the hole-section-side protrusions adjacent to each other, and the fitting-shaft section fits into the fitting-hole section.

8 Claims, 5 Drawing Sheets

(56) References Cited

U.S. PATENT DOCUMENTS

| | | | |
|---|---|---|---|
| 4,340,190 A * | 7/1982 | Zavatkay | 242/375.2 |
| 4,679,109 A * | 7/1987 | Okamura et al. | 360/132 |
| 4,995,567 A * | 2/1991 | Ballet | 242/375.2 |
| 5,314,137 A * | 5/1994 | Fujimura et al. | 242/375.2 |
| 5,755,393 A * | 5/1998 | Frei et al. | 242/372 |
| 5,855,335 A * | 1/1999 | Hanna | 242/375.2 |
| 6,029,924 A * | 2/2000 | Ono et al. | 242/379.1 |
| 6,367,729 B1 * | 4/2002 | Inagawa et al. | 242/379.1 |
| 6,390,404 B2 * | 5/2002 | McCulloch | 242/375 |
| 6,863,234 B2 * | 3/2005 | Mishina et al. | 242/379.1 |
| 7,543,625 B2 * | 6/2009 | Beaudoin et al. | 160/191 |
| 7,651,136 B2 * | 1/2010 | Kielwein et al. | 280/805 |
| 2001/0006203 A1 * | 7/2001 | Mishina et al. | 242/379.1 |
| 2006/0011764 A1 * | 1/2006 | Inagawa et al. | 242/382 |
| 2006/0163411 A1 * | 7/2006 | Takamatsu et al. | 242/379.1 |

FOREIGN PATENT DOCUMENTS

| | | |
|---|---|---|
| EP | 1488968 | 12/2004 |
| EP | 1488968 A1 | 12/2004 |
| JP | 2005289320 | 10/2005 |
| JP | 2007-321773 | 12/2007 |
| JP | 2010-070157 | 4/2010 |

OTHER PUBLICATIONS

European Search Report Application No. 11169918.7-1523 mailed Aug. 19, 2011.

European Search Report issued on Aug. 19, 2011 in corresponding application EP 11169918.

* cited by examiner

WEBBING TAKE-UP DEVICE

CROSS-REFERENCE TO RELATED APPLICATION

This application claims priority under 35 USC 119 from Japanese Patent Application No. 2010-137380 filed Jun. 16, 2010, the disclosure of which is incorporated by reference herein.

BACKGROUND OF THE INVENTION

1. Field of the Invention

The present invention relates to a webbing take-up device in which a spool is rotated by an urging force of a spring such as a spiral spring so that a webbing belt can be taken up by the spool.

2. Related Art

A male screw formed on one surface of an abut plate is threadedly engaged with a threaded hole formed in another end in axial-direction of a torsion shaft constituting a webbing take-up device disclosed in Japanese Patent Application Laid-Open (JP-A) No. 2005-289320 (hereinafter, Patent Document 1). A fixation pole formed on another surface of the abut plate intrudes in a spring cover. In Patent Document 1, an inner-side end in spiral-direction of the spiral spring is engaged with the fixation pole, but generally, a member referred to as an adapter, with which the inner-side end in spiral-direction of the spiral spring is engaged, is rotatably supported inside the housing (referred to as a spring cover in Patent Document 1) in a rotational direction of the spool. A fitting shaft formed to project from the other surface of the abut plate is fitted into a fitting hole formed in the adapter. Thereby, the torsion shaft and the adapter are coupled to each other so as not to be capable of relative rotation.

Incidentally, an outer peripheral shape of the fitting shaft formed to project from the other surface of the abut plate is a non-circular shape such as a star-like shape or a polygonal shape. Thus, the fitting hole formed in the adapter correspondingly to the outer peripheral shape of the fitting shaft is also a non-circular shape. Therefore, under a state in which a phase of the fitting hole and a phase of the fitting shaft about a central axis line of the fitting shaft are shifted from each other, the fitting shaft cannot be inserted into the fitting hole. As a result, in order to fit-insert the fitting shaft into the fitting hole, it has been required such a troublesome operation as to align the phase of the fitting shaft and the phase of the fitting hole with each other.

SUMMARY OF THE INVENTION

In consideration of the above-mentioned facts, the present invention has an object to obtain a webbing take-up device in which a shaft section on a spool side can be easily fitted into an adapter on a spring side.

A webbing take-up device according to a first aspect of the present invention includes: a spool, including a spool body to which a proximal end side in a longitudinal direction of a long-belt-like webbing belt is connected and which takes up the webbing belt from the proximal end side thereof by rotation of the spool body in a take-up direction that is one direction about a central axis line of the spool body, a fitting shaft section being provided at the spool body at one end section in an axial direction of the spool body, the fitting shaft section being coaxial and integral with the spool body; an adapter provided at a lateral side of the one end section in the axial direction of the spool body, the adapter including a fitting hole section into which the fitting shaft section can be fitted in a state in which a phase of the fitting hole section matches a phase of the fitting shaft section about the central axis line, relative rotation of the adapter with respect to the fitting shaft section about the central axis line being regulated in a state in which the fitting shaft section is fitted into the fitting hole section; and a spring assembly including a housing that is provided so as to face the one end section in the axial direction of the spool body along the axial direction of the spool body and that accommodates the adapter at an inner side thereof in a state in which an opening side of the fitting hole section of the adapter is externally exposed such that the housing supports the adapter rotatably about the central axis line, a spring being provided inside of the housing, one end of the spring being connected to the housing and another end of the spring being connected to the adaptor, an urging force of the spring in the take-up direction being increased by the adapter being rotated in a pull-out direction that is opposite to the take-up direction, wherein a guide section is provided on at least one of the adapter or the spool, the guide section pressing the adapter in the pull-out direction or the guide section being pressed by the fitting shaft section in the pull-out direction when a leading end side of the fitting shaft section intrudes into the fitting hole section in a state in which the phase of the fitting shaft section diverges from the phase of the fitting hole section, whereby, by a force of the pressing, the guide section causes the adapter to rotate relatively with respect to the fitting shaft section in the pull-out direction to a rotational position at which the fitting shaft section can be fitted into the fitting hole section.

In the webbing take-up device according to the first aspect of the present invention, the housing which constitutes the spring assembly is provided on the lateral side of the one end section in axial-direction of the spool body constituting the spool. In the housing, the one end of the spring is engaged (connected or caught) with the housing, and the other end of the spring is engaged (connected or caught) with the adapter provided inside the housing.

Meanwhile, in the webbing take-up device according to the present invention, on the lateral side (outer side) of the one end section in axial-direction of the spool body constituting the spool, the fitting shaft section is provided coaxially and integrally with the spool body, and the fitting shaft section and the fitting hole section formed in the adapter are fitted to each other. When the webbing belt is pulled out from the spool so that the fitting shaft section is rotated in the pull-out direction together with the spool body, the adapter is rotated in the pull-out direction together with the fitting shaft section. The rotation of the adapter into the pull-out direction causes the urging force of the spring into the take-up direction to increase. The spool can be rotated in the take-up direction by the urging force of the spring thus increased, and the webbing belt can be taken up by the spool.

Incidentally, the above-mentioned fitting shaft section is allowed to intrude into the fitting hole section under the state in which the phase of the fitting shaft section about the central axis line of the spool body with respect to the phase of the fitting hole section match each other. At least one of the adapter and the spool is provided with the guide section(s).

In a case where the guide section is provided at the spool, as a result of making the leading end side of the fitting shaft section intrude into the fitting hole section under the state in which the phase of the fitting shaft section does not match the phase of the fitting hole section, the guide section presses the adapter to the pull-out direction. The pressing force generated by this pressing causes the adapter to rotate relatively to the fitting shaft section to the pull-out direction to the rotational position at which the fitting shaft section fits into the fitting hole section (that is, a position at which the phase of the fitting shaft section matches the phase of the fitting hole section).

Meanwhile, in a case where the guide section is provided at the adapter, as a result of making the leading end side of the fitting shaft section intrude into the fitting hole section under the state in which the phase of the fitting shaft section does not match the phase of the fitting hole section, the guide section is pressed by the spool to the pull-out direction. The pressing force generated by this pressing causes the adapter to rotate relatively to the fitting shaft section to the pull-out direction to the rotational position at which the fitting shaft section fits into the fitting hole section (that is, a position at which the phase of the fitting shaft section matches the phase of the fitting hole section).

Thereby, even when the phases of the fitting shaft section and the fitting hole section are not matched with each other at the time of fitting the fitting shaft section into the fitting hole section, the fitting shaft section can be easily fitted into the fitting hole section.

A webbing take-up device according to a second aspect of the present invention is that, in the first aspect of the present invention, the fitting shaft section includes: a shaft-section body which is coaxial with the spool body; and a plurality of shaft-section-side protrusions formed so as to project from an outer peripheral section of the shaft-section body with an interval therebetween about the central axis line, and the adapter includes: a hole-section body having an inner diameter dimension that is larger than an outer diameter dimension of the shaft-section body and which can accommodate the shaft-section body and the plurality of shaft-section-side protrusions at an inner side thereof; and a plurality of hole-section-side protrusions formed so as to project from an inner peripheral section of the hole-section body, in a state in which the shaft-section-side protrusions intrude into the hole-section body, the hole-section-side protrusions facing the shaft-section-side protrusions about the central axis line and interfering with the shaft-section-side protrusions, whereby the relative rotation of the fitting shaft section with respect to the adapter is regulated, and a shaft-section-side inclined surface which is inclined toward a pull-out direction side is formed at an end section of the shaft-section-side protrusions, the end section facing a leading end side of the shaft-section body, and the guide section is configured so as to include the shaft-section-side inclined surface.

In the webbing take-up device according to the second aspect of the present invention, the fitting shaft section includes the shaft-section body coaxial with the spool body, and the plural shaft-section-side protrusions are formed from the outer peripheral section of the shaft-section body at every predetermined angle about the central axis line of the spool body. Meanwhile, the fitting hole section of the adapter includes the hole-section body capable of accommodating the above-mentioned shaft-section body and the shaft-section-side protrusions. On the inner peripheral section of the fitting hole section, the plural hole-section-side protrusions are formed at every predetermined angle about the central axis line of the spool body.

When the fitting shaft section is fit-inserted into the fitting hole section, the shaft-section-side protrusions and the hole-section-side protrusions face each other about the central axis line of the spool body. When the fitting shaft section attempts to rotate with respect to the adapter, the hole-section-side protrusions interfere with the shaft-section-side protrusions. In this manner, the relative rotation of the fitting shaft section with respect to the adapter is regulated.

On the leading end side with respect to an intermediate section in axial-direction of the shaft-section body constituting the fitting shaft section, the shaft-section-side inclined surfaces constituting the guide section are formed at the above-mentioned shaft-section-side protrusions. The shaft-section-side inclined surface is formed by making inclination of the end section of the shaft-section-side protrusion toward a pull-out direction side, the end section being directed to the leading end side of the shaft-section body (that is, directing the end section, at the leading end side of the shaft section body, in the shaft-section-side protrusion toward the pull-out direction side).

When the leading end side of the fitting shaft section has been made to intrude into the fitting hole section under the state in which the phase of the fitting shaft section does not match the phase of the fitting hole section, and thus the shaft-section-side inclined surfaces have been made to interfere with the hole-section-side protrusions, the shaft-section-side inclined surfaces press the hole-section-side protrusions to the pull-out direction about the central axis line of the spool body while the shaft-section-side inclined surfaces press the hole-section-side protrusions to the axial direction of the spool body. Thereby, the adapter is rotated relatively to the fitting shaft section to the pull-out direction to the rotational position at which the phase of the fitting shaft section matches the phase of the fitting hole section.

In the webbing take-up device of the second aspect, it is possible that a hole-section-side inclined surface which is inclined toward the take-up direction side is formed at an end section of the hole-section-side protrusions, the end section facing an opening end side of the hole-section body, and the guide section is configured so as to include the hole-section-side inclined surface.

A webbing take-up device according to a third aspect of the present invention is that, in the first aspect of the present invention, the fitting shaft section includes: a shaft-section body which is coaxial with the spool body; and a plurality of shaft-section-side protrusions formed so as to project from an outer peripheral section of the shaft-section body with an interval therebetween about the central axis line, and the adapter includes: a hole-section body having an inner diameter dimension that is larger than an outer diameter dimension of the shaft-section body and which can accommodate the shaft-section body and the plurality of shaft-section-side protrusions at an inner side thereof; and a plurality of hole-section-side protrusions formed so as to project from an inner peripheral section of the hole-section body, in a state in which the shaft-section-side protrusions intrude into the hole-section body, the hole-section-side protrusions facing the shaft-section-side protrusions about the central axis line and interfering with the shaft-section-side protrusions, whereby the relative rotation of the fitting shaft section with respect to the adapter is regulated, and a hole-section-side inclined surface which is inclined toward a take-up direction side is formed at an end section of the hole-section-side protrusions, the end section facing an opening end side of the hole-section body, and the guide section is configured so as to include the hole-section-side inclined surface.

In the webbing take-up device according to the third aspect of the present invention, the fitting shaft section includes the shaft-section body coaxial with the spool body, and the plural shaft-section-side protrusions are formed from the outer peripheral section of the shaft-section body at every predetermined angle about the central axis line of the spool body. Meanwhile, the fitting hole section of the adapter includes the hole-section body capable of accommodating the above-mentioned shaft-section body and the shaft-section-side protrusions. On the inner peripheral section of the fitting hole section, the plural hole-section-side protrusions are formed at every predetermined angle about the central axis line of the spool body.

When the fitting shaft section is made to fit-insert into the fitting hole section, the shaft-section-side protrusions and the hole-section-side protrusions face each other about the central axis line of the spool body. When the fitting shaft section attempts to rotate with respect to the adapter, the shaft-section-side protrusions interfere with the hole-section-side protrusions. In this manner, the relative rotation of the fitting shaft section with respect to the adapter is regulated.

The hole-section-side inclined surfaces constituting the guide section are formed at the hole-section-side protrusions consisting the fitting hole section. The hole-section-side inclined surface is formed by making inclination of the end section of the hole-section-side protrusion to the take-up direction, the end section being directed to the opening end side (spool side) of the hole-section body (that is, directing the end section, at the opening end side of the hole section body, in the hole-section-side protrusion toward the take-up-direction side).

When the leading end side of the fitting shaft section has been made to intrude into the fitting hole section under the state in which the phase of the fitting shaft section does not match the phase of the fitting hole section, and thus the hole-section-side inclined surfaces have been made to interfere with the shaft-section-side protrusions, the shaft-section-side protrusions press the hole-section-side inclined surfaces. As described above, the hole-section-side inclined surface is directed to the take-up-direction side. Thus, the pressing force which the hole-section-side inclined surface receives from the shaft-section-side protrusion acts not only in the axial direction of the spool body, but also as the pressing force into the pull-out direction about the axis line of the spool body. Thereby, the adapter is rotated relatively to the fitting shaft section to the pull-out direction to the rotational position at which the phase of the fitting shaft section matches the phase of the fitting hole section.

A webbing take-up device according to a fourth aspect of the present invention is that, in any one of the first to third aspects of the present invention, an engagement section is formed in the adapter, the engagement section regulating the rotation of the adapter in the take-up direction as a result of a surface of the engagement section facing the take-up direction being interfered with by a stopper that is provided so as to be attachable to and removable from the adapter and the housing.

In the webbing take-up device according to the fourth aspect of the present invention, the engagement section is formed at the adapter. When the stopper attachably and detachably provided to the adapter and the housing of the spring assembly has interfered with the surface on the take-up direction side in the engagement section of the adapter, the rotation of the adapter into the take-up direction is regulated. As described above, the other end of the spring is engaged (connected) with the adapter, and hence inadvertent rotation into the pull-out direction is regulated by urging from the spring into the take-up direction. Further, the rotation into the take-up direction is regulated by the stopper, and hence the adapter is stabilized.

When the leading end side of the fitting shaft section has been made to intrude into the fitting hole section under the state in which the phase of the fitting shaft section does not match the phase of the fitting hole section of the adapter thus stabilized, the guide section causes the adapter to rotate relatively into the pull-out direction. In this manner, the adapter is rotated relatively to the fitting shaft section to the rotational position at which the phase of the fitting shaft section matches the phase of the fitting hole section.

Further, in any one of the first to the fourth aspects of the present invention, it is possible that the device further includes a one-end-side member which is integrally provided at the spool body at the one end section in the axial direction, the fitting shaft section being formed to protrude from one end side in the axial direction of the one-end-side member, and another end side in the axial direction of the one-end-side member being fixed to the spool body.

Further, in the second aspect of the present invention, it is possible that when the leading end side of the fitting shaft section intrudes into the fitting hole section in the state in which the phase of the fitting shaft section diverges from the phase of the fitting hole section, the shaft-section-side inclined surface presses the hole-section-side protrusions in the pull-out direction about the central axis line of the spool body and in the axial direction of the spool body.

Further, in the third aspect of the present invention, it is possible that when the leading end side of the fitting shaft section intrudes into the fitting hole section in the state in which the phase of the fitting shaft section diverges from the phase of the fitting hole section, the hole-section-side inclined surface is pressed by the shaft-section-side protrusions in the pull-out direction about the central axis line of the spool body and in the axial direction of the spool body.

As described hereinabove, in the webbing take-up device according to the present invention, the fitting shaft section on the spool side can be easily fitted into the fitting hole section of the adapter provided on the spring side.

BRIEF DESCRIPTION OF THE DRAWINGS

Embodiments of the invention will be described in detail with reference to the following figures, wherein:

FIGS. 5A and 5B illustrate a housing of a spring assembly viewed from a spool side; specifically.

DETAILED DESCRIPTION OF THE INVENTION

<Structure of a Present Embodiment>

Figure 1:
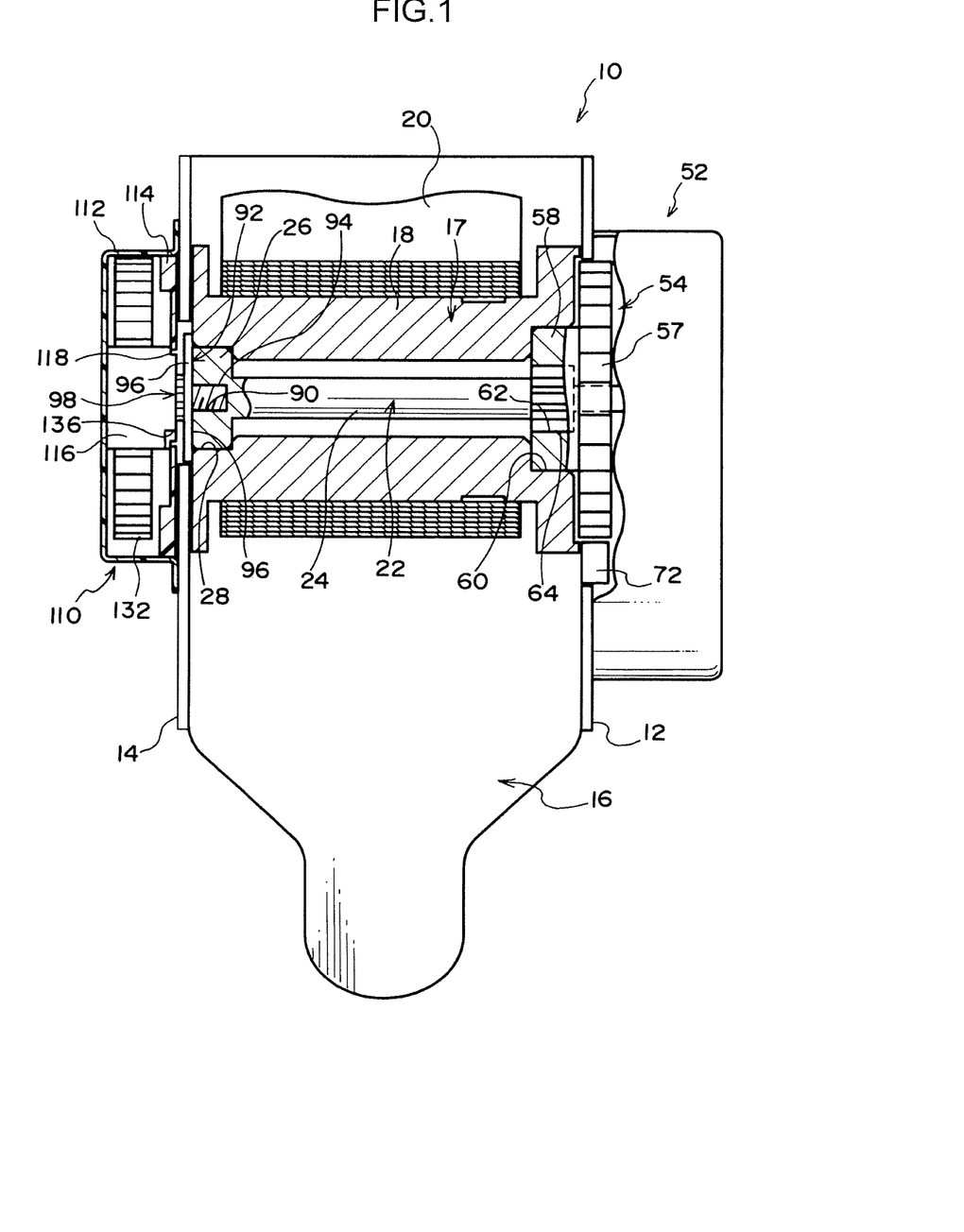
FIG. 1 is a front sectional view schematically illustrating a structure of a webbing take-up device according to an embodiment of the present invention.

FIG. 1 is a front sectional view schematically illustrating a structure of a webbing take-up device 10. As illustrated in the figures, the webbing take-up device 10 includes a frame 16 constituted by including a leg plate 12 and a leg plate 14 facing each other in a thickness direction. A spool 17 is provided between the leg plate 12 and the leg plate 14 of the frame 16. The spool 17 includes a spool body 18 formed as a whole in a cylindrical shape, an axial direction of which is along a facing direction of the leg plate 12 and the leg plate 14.

A proximal (base) end side in longitudinal-direction of a webbing belt 20 formed in a long-belt-like shape is engaged (connected or caught) with the spool body 18. When the spool body 18 is rotated in the take-up direction, which is one direction about a central axis line thereof, the webbing belt 20 is taken up from the proximal end side in longitudinal-direction thereof around an outer peripheral section of the spool body 18. When the webbing belt 20 is pulled toward a leading end side thereof, the spool body 18 is rotated in the pull-out direction opposite to the take-up direction, with a part of the webbing belt 20 being pulled out, the part having been taken up on the spool body 18.

In the spool body 18, in this embodiment, there is provided a torsion shaft 22 constituting the spool 17 together with the spool body 18. The torsion shaft 22 includes a bar-like shaft body 24, an axial direction of which is along the axial direction of the spool body 18. A spool-side coupling section 26 is formed at one end section in axial direction of the shaft body 24. The spool-side coupling section 26 has an outer peripheral shape formed in a non-circular shape such as a star-like shape or a polygonal shape. Correspondingly to the spool-side coupling section 26, a fitting section 28 is formed in an inner peripheral section of the spool body 18 in a vicinity of one end section in axial direction of the spool body 18. Fitting the spool-side coupling section 26 to the fitting section 28 causes the torsion shaft 22 to be coupled to the spool body 18 under a state in which relative rotation with respect to the spool body 18 is regulated (a state in which relative rotation with respect to the spool body 18 is substantially impossible). In this state, the shaft body 24 is arranged coaxially with the spool body 18.

Meanwhile, a lock base 54 constituting a locking mechanism 52 is provided on another end side in axial direction of the spool body 18. The lock base 54 includes a lock-base body 57, ratchet teeth being formed on an outer peripheral section thereof. On a spool-body 18 side of the lock-base body 57, an insertion section 58 having a circular outer peripheral section is formed coaxially with the ratchet teeth. Correspondingly to the insertion section 58, a circular hole 60 is formed coaxially with the spool body 18 on the other end side in axial direction of the spool body 18. The circular hole 60 opens at another end section in axial direction of the spool body 18 so that the insertion section 58 is fit-inserted in such a state so as to be rotatable relative to the spool body 18.

Further, in the insertion section 58, a fit-insertion hole 62 opening on a side opposite to the lock-base body 57 is formed. The fit-insertion hole 62 has an inner peripheral shape formed in a non-circular shape such as a star-like shape or a polygonal shape so that a lock-base-side coupling section 64 formed at another end section in axial direction of the shaft body 24 is fit-inserted into the fit-insertion hole 62. Thereby, the lock base 54 is coupled under a state in which relative rotation with respect to the torsion shaft 22 is regulated (a state in which relative rotation with respect to the torsion shaft 22 is substantially impossible). As described above, although the insertion section 58 of the lock base 54 is fit-inserted into the circular hole 60 so as to be capable of relative rotation with respect to the spool body 18, the torsion shaft 22 is coupled to the spool body 18 through the spool-side coupling section 26 so as substantially not to be capable of relative rotation with respect to the spool body 18. Thereby, the lock base 54 is coupled to the spool body 18 through the torsion shaft 22 so as substantially not to be capable of relative rotation with respect to the spool body 18.

On an outside in rotational-radial-direction of the lock base 54, there is provided a lock pawl 72 constituting the locking mechanism 52 together with the lock base 54. The lock pawl 72 is supported by the leg plate 12 and the like so as to be turnable about an axis which is in the same direction as the axial direction of the spool body 18. Further, the lock pawl 72 is provided with locking teeth. When the lock pawl 72 has turned to one side about the axis thereof, the locking teeth of the lock pawl 72 come close to the outer peripheral section of the lock-base body 57 to mesh with the ratchet teeth of the lock-base body 57. In this manner, the rotation of the lock base 54 to the pull-out direction is regulated.

The locking mechanism 52 constituted by such the lock base 54 and the lock pawl 72 includes various components (not shown in the drawings) constituting so-called a "VSIR mechanism" which acts in a case where a vehicle abruptly decelerates and includes various other components (not shown in the drawings) constituting so-called a "WSIR mechanism" which acts in a case where rotational acceleration of the spool body 18 to the pull-out direction reaches a predetermined magnitude or higher. In response to actions of such "VSIR mechanism" or "WSIR mechanism", the lock pawl 72 is turned to such a direction that the locking teeth come close to the outer peripheral section of the lock-base body 57.

Meanwhile, in the spool-side coupling section 26, a female thread hole 90 opening toward a direction opposite to the shaft body 24 is formed coaxially with the shaft body 24 and the spool body 18. A male thread section 94 of a spring screw 92 constituting the spool 17 together with the spool body 18 and the torsion shaft 22 is threadedly engaged with the female thread hole 90. On a proximal end side of the male threaded section 94, in the spring screw 92, a flange section 96 is formed. The flange section 96 has an outer peripheral shape larger than an outer peripheral shape of the fitting section 28. On an outer side relative to the fitting section 28, at least a part of the flange section 96 faces the one end section in axial direction of the spool body 18.

Figure 2:
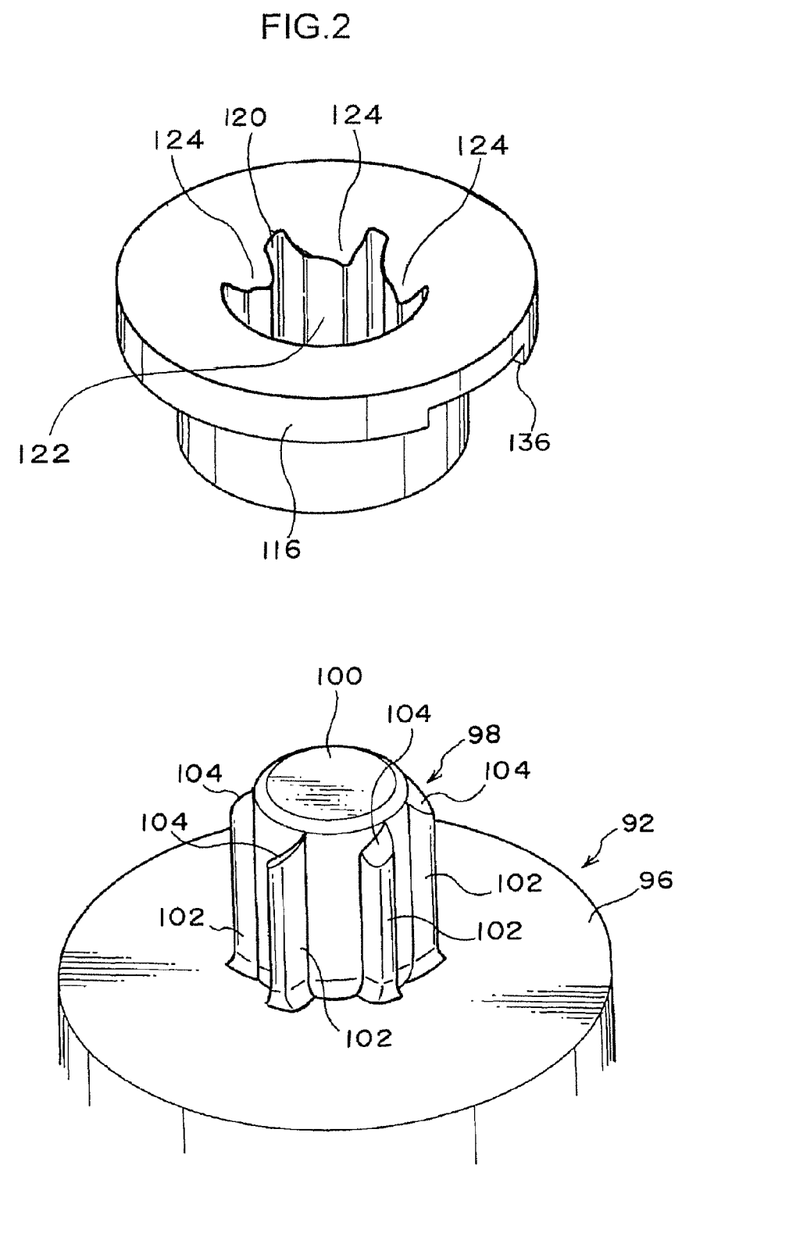
FIG. 2 is an enlarged perspective view of a fitting-shaft section and a fitting-hole section of an adapter.
Figure 3:
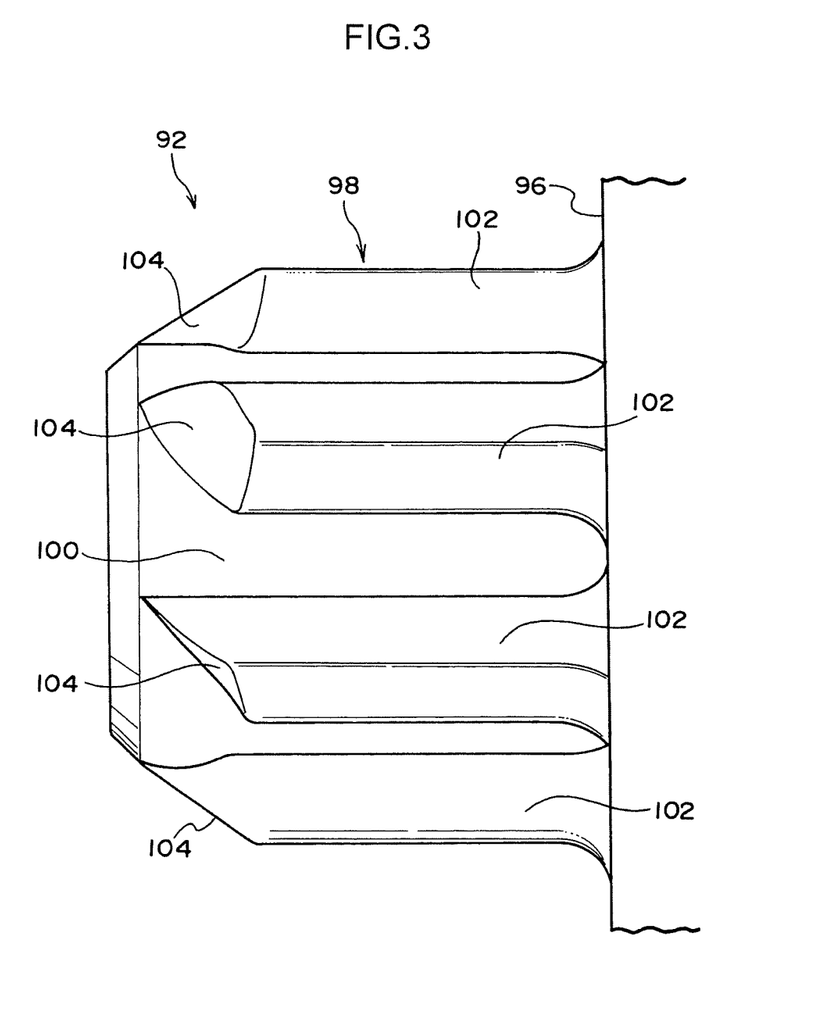
FIG. 3 is an enlarged front view of the fitting-shaft section.

A fitting shaft section 98 is formed on a side, which is opposite to the male threaded section 94, of the flange section 96. As illustrated in FIG. 2 and FIG. 3, the fitting shaft section 98 includes a shaft-section body 100. The shaft-section body 100 is formed to project from the flange section 96 coaxially with the male thread section 94. Plural shaft-section-side protrusions 102 are formed on an outer peripheral section of the shaft-section body 100. The shaft-section-side protrusions 102 are formed about a central axis line of the shaft-section body 100 at every predetermined angle so as to project from the outer peripheral section of the shaft-section body 100 toward an outer side in radial direction of the shaft-section body 100.

In each of the shaft-section-side protrusions 102, a shaft-section-side inclined surface 104 constituting a guide section is formed. The shaft-section-side inclined surface 104 is formed at a leading (tip) end of each of the shaft-section-side protrusions 102 which are along a projecting direction of the shaft-section body 100 from the flange section 96. The shaft-section-side inclined surface 104 is inclined in the pull-out direction with respect to the projecting direction of the shaft-section body 100 from the flange section 96. In addition, the shaft-section-side inclined surface 104 is curved with a predetermined curvature so that the surface swells in a direction which is inclined in the pull-out direction with respect to the projecting direction of the shaft-section body 100 from the flange section 96.

Meanwhile, as illustrated in FIG. 1, a housing 112 constituting a spring assembly 110 is attached to a side, which is opposite to the leg plate 12, of the leg plate 14. The housing 112 is formed in a box-like shape opening toward the leg plate 14, and an opening end thereof is closed by a sheet 114 formed in a plate-like shape. An adapter 116 is provided inside the housing 112. The adapter 116 is formed in a cylinder-columnar shape, an axial direction thereof being along the axial direction of the spool body 18, and is supported by the housing 112 coaxially with and rotatably to the spool body 18. Correspondingly to the adapter 116, a circular hole 118 is formed in the sheet 114, and an end section at leg-plate 14 side of the adapter 116 is exposed to an outside.

Figure 4:
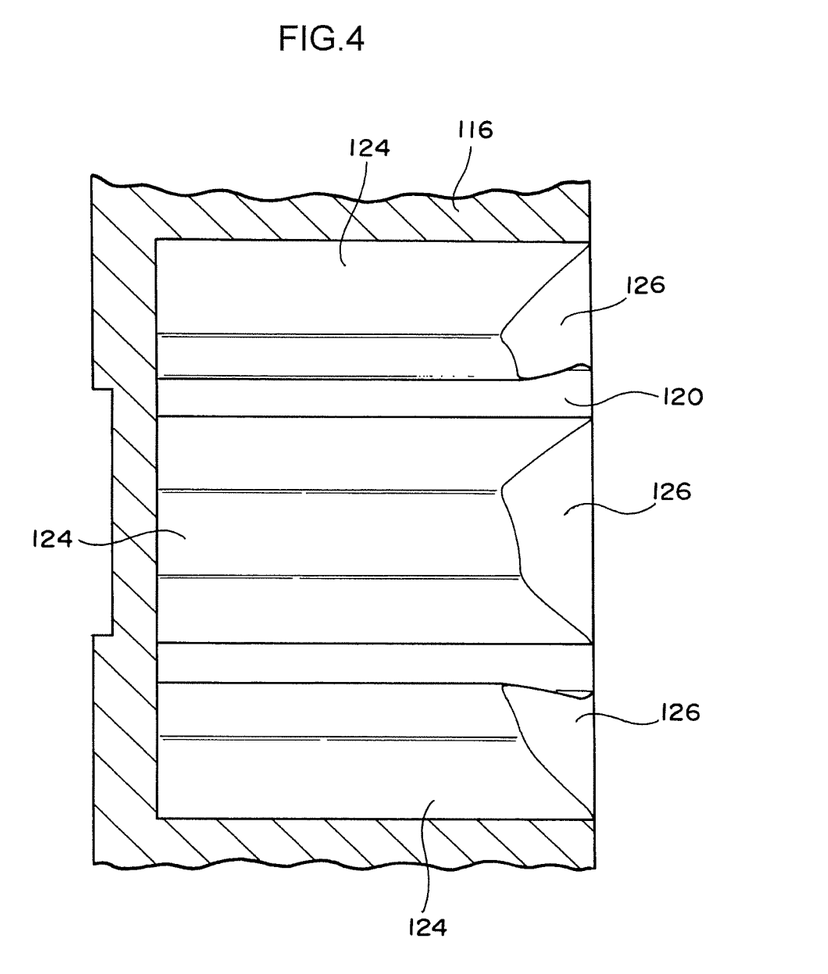
FIG. 4 is an enlarged front view of a fitting-hole section.

Further, in the adapter 116, a fitting hole section 120 opening at the end section at leg-plate 14 side of the adapter 116 is formed. As illustrated in FIG. 2 and FIG. 4, the fitting hole section 120 includes a hole-section body 122. The hole-section body 122 has an inner peripheral shape formed to be larger than an imaginary circle obtained, in the above-mentioned fitting shaft section 98, by connecting the end sections at projecting-direction sides of the shaft-section-side protrusions 102 from the shaft-section body 100. So, the hole-section body 122 is capable of accommodating the fitting shaft section 98 therein.

From an inner peripheral section of the hole-section body 122, plural hole-section-side protrusions 124 are formed to project inward in opening-radial-direction of the hole-section body 122. Each of the hole-section-side protrusions 124 is formed correspondingly to a gap between the shaft-section-side protrusions 102 adjacent to each other around the shaft-section body 100. When the fitting shaft section 98 is inserted into the fitting hole section 120, the shaft-section-side protrusions 102 intrude respectively into the gaps between the hole-section-side protrusions 124 adjacent to each other in a circumferential direction.

Thus, when it attempts to carry out a relative rotation of the spring screw 92 with respect to the adapter 116, the shaft-section-side protrusions 102 are interfered with the hole-section-side protrusions 124. In this manner, the relative rotation of the spring screw 92 with respect to the adapter 116 is regulated. Further, as illustrated in FIG. 4, an end section at opening end side of the fitting hole section 120 in each of the hole-section-side protrusions 124 is formed as a hole-section-side inclined surface 126 constituting a guide section. The hole-section-side inclined surface 126 is inclined in the take-up direction with respect to an opening direction of the fitting hole section 120. In addition, the hole-section-side inclined surface 126 is curved with a predetermined curvature such that the surface swells in a direction inclined in the take-up direction with respect to the opening direction of the fitting hole section 120.

Figure 5A:
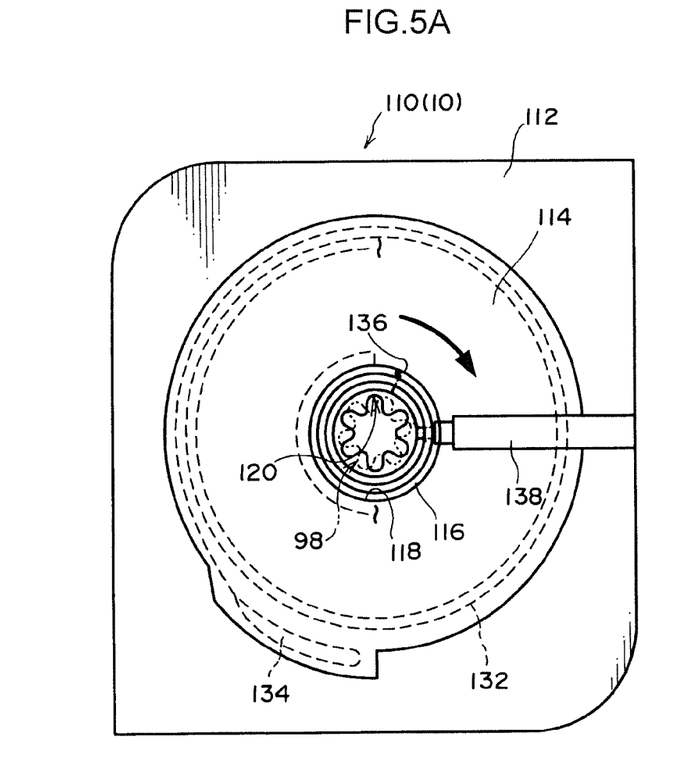
FIG. 5A illustrates a state in which rotation of the adapter into a take-up direction is regulated by a stopper.
Figure 5B:
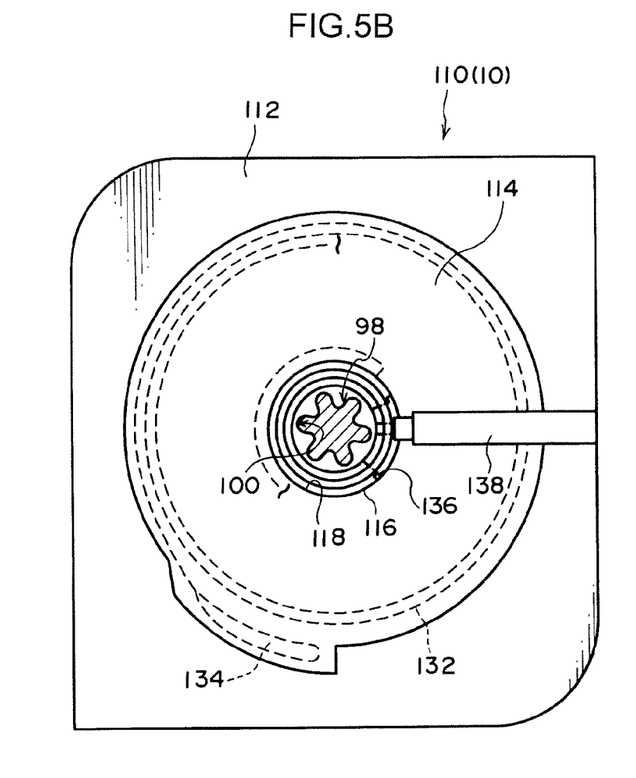
FIG. 5B illustrates a state in which the adapter is rotated in a pull-out direction from the state of FIG. 5A.

As illustrated in FIG. 5A and FIG. 5B, an inner-side end in spiral-direction of a spiral spring 132 as a spring provided in the housing 112 is engaged (connected or caught) with an outer peripheral section of the adapter 116. An outer-side end in spiral-direction of the spiral spring 132 is engaged (connected or caught) with an engagement (connect or catch) protrusion 134 formed in the housing 112. When the adapter 116 is rotated in the pull-out direction, the spiral spring 132 is wound-fasten up to urge the adapter 116 in the take-up direction.

Further, in the adapter 116, a stopper-insertion hole 136 is formed. The stopper-insertion hole 136 opens in the outer peripheral section of the adapter 116, and a leading end side of a stopper 138 for temporarily holding the adapter 11 is made to intrude thereinto. The stopper 138 is held by the sheet 114 so as to be capable of being inserted and pulled off with respect to the stopper-insertion hole 136 in a radial direction of the adapter 116. The adapter 116 having received an urging force of the spiral spring 132 brings a surface, which is directed to the take-up direction of the adapter 116, of inner surfaces of the stopper-insertion hole 136, into press-contact with a leading end of the stopper 138, thereby inadvertent rotation of the adapter 116 is regulated.

Note that, an interval between the surface which is directed to the take-up direction and the surface which is directed to the pull-out direction of the adapter 116, in the inner surfaces of the stopper-insertion hole 136 is sufficiently larger than a leading end of the stopper 138, and is set to an interval between one shaft-section-side protrusion 102 and the other the shaft-section-side protrusion 102 which are adjacent to each other around the shaft-section body 100.

<Functions and Advantages of this Embodiment>

In the webbing take-up device 10, the torsion shaft 22 to which the spring screw 92 is assembled is further assembled to the spool body 18. On the other hand, the adapter 116 and the spiral spring 132 are assembled inside the housing 112, and the opening end of the housing 112 is closed by the sheet 114, and the rotation of the adapter 116 into the take-up direction is regulated by the stopper 138.

In such a state, the fitting shaft section 98 integrated with the spool body 18 is fitted into the fitting hole section 120 of the adapter 116. When it attempts to insert the fitting shaft section 98 into the fitting hole section 120 under a state in which the gap between the hole-section-side protrusions 124 adjacent to each other and the shaft-section-side protrusion 102 do not face each other in the axial direction of the spool body 18 (that is, under a state in which a phase of the fitting shaft section 98 is shifted with respect to a phase of the fitting hole section 120 about the central axis line of the spool body 18), the shaft-section-side inclined surface 104 formed on each of the shaft-section-side protrusions 102 comes into contact (linear contact or point contact) with the hole-section-side inclined surface 126 formed on each of the hole-section-side protrusions 124.

In this state, when it attempts to further insert the fitting shaft section 98 into the fitting hole section 120, the shaft-section-side inclined surfaces 104 press the hole-section-side protrusions 124. The shaft-section-side inclined surface 104 is inclined in the pull-out direction with respect to the projecting direction of the shaft-section body 100 from the flange section 96, and the hole-section-side inclined surface 126 is inclined in the take-up direction with respect to the opening direction of the fitting hole section 120. Thus, the shaft-section-side inclined surface 104 presses the hole-section-side inclined surface 126 to such a direction as to be inclined in the pull-out direction with respect to the projecting direction of the shaft-section body 100 from the flange section 96. In the adapter 116 in which a force of this pressing has been received at the hole-section-side inclined surface 126, a rotational force in the pull-out direction is generated.

In the adapter 116, the leading end side of the stopper 138 is inserted in the stopper-insertion hole 136, and hence the rotation into the take-up direction is regulated, but the adapter 116 can be rotated into the pull-out direction with a predetermined angle. Thus, due to being generated the rotational force in the pull-out direction as described above in the adapter 116, the adapter 116 is made to rotate in the pull-out direction. As a result of such rotation of the adapter 116 into the pull-out direction, when the phase of the fitting hole section 120 and the phase of the fitting shaft section 98 are aligned with each other about the central axis line of the spool body 18, the shaft-section-side protrusions 102 intrude respectively into the gaps each between the hole-section-side protrusions 124 adjacent to each other, and the fitting shaft section 98 fits into the fitting hole section 120.

In this manner, in the webbing take-up device 10, in assembly process thereof, it is not necessary to align the phase of the fitting shaft section 98 with respect to the phase of the fitting hole section 120 about the central axis line of the spool body 18 with each other. Thus, the fitting shaft section 98 can be easily fitted into the fitting hole section 120.

Note that, in this embodiment, a structure is employed in which the shaft-section-side inclined surface 104 is formed on each of the shaft-section-side protrusions 102 of the fitting shaft section 98 and the hole-section-side inclined surface 126 is formed on each of the hole-section-side protrusions 124 of the fitting hole section 120 of the adapter 116. Alternatively, a structure may be employed in which the shaft-section-side inclined surface 104 is formed on the shaft-section-side protrusion 102 but the hole-section-side inclined surface 126 is not formed on the hole-section-side protrusion 124. Still alternatively, a structure may be employed in which the hole-section-side inclined surface 126 is formed on the hole-section-side protrusion 124 but the shaft-section-side inclined surface 104 is not formed on the shaft-section-side protrusion 102.

Further, in this embodiment, although the spool 17 is constituted by the spool body 18, the torsion shaft 22 and the spring screw 92, it suffices that the spool includes the spool body that takes up the webbing belt 20 from the proximal end side thereof and the fitting shaft section capable of fitting into the fitting hole section 120 of the adapter 116. Thus, a structure may be employed in which the fitting shaft section 98 may be formed to project on one end section in axial direction of the spool body 18 while the spool not including the torsion shaft 22 and the spring screw 92.

What is claimed is:

1. A webbing take-up device comprising:
    a spool, including a spool body to which a proximal end side in a longitudinal direction of a long-belt-like webbing belt is connected and which takes up the webbing belt from the proximal end side thereof by rotation of the spool body in a take-up direction that is one direction about a central axis line of the spool body, a fitting shaft section being provided at the spool body at one end section in an axial direction of the spool body, the fitting shaft section being coaxial and integral with the spool body;
    an adapter provided at a lateral side of the one end section in the axial direction of the spool body, the adapter including a fitting hole section into which the fitting shaft section can be fitted in a state in which a phase of the fitting hole section matches a phase of the fitting shaft section about the central axis line, relative rotation of the adapter with respect to the fitting shaft section about the central axis line being regulated in a state in which the fitting shaft section is fitted into the fitting hole section; and
    a spring assembly including a housing that is provided so as to face the one end section in the axial direction of the spool body along the axial direction of the spool body and that accommodates the adapter at an inner side thereof in a state in which an opening side of the fitting hole section of the adapter is externally exposed such that the housing supports the adapter rotatably about the central axis line, a spring being provided inside of the housing, one end of the spring being connected to the housing and another end of the spring being connected to the adaptor, an urging force of the spring in the take-up direction being increased by the adapter being rotated in a pull-out direction that is opposite to the take-up direction,
    wherein a guide section is provided on at least one of the adapter or the spool, the guide section pressing the adapter in the pull-out direction or the guide section being pressed by the fitting shaft section in the pull-out direction when a leading end side of the fitting shaft section intrudes into the fitting hole section in a state in which the phase of the fitting shaft section diverges from the phase of the fitting hole section, whereby, by a force of the pressing, the guide section causes the adapter to rotate relatively in only one direction with respect to the fitting shaft section in the pull-out direction to a rotational position at which the fitting shaft section can be fitted into the fitting hole section,
    wherein the fitting shaft section includes: a shaft-section body which is coaxial with the spool body; and a plurality of shaft-section-side protrusions formed so as to project from an outer peripheral section of the shaft-section body with an interval therebetween about the central axis line, and the adapter includes: a hole-section body having an inner diameter dimension that is larger than an outer diameter dimension of the shaft-section body and which can accommodate the shaft-section body and the plurality of shaft-section-side protrusions at an inner side thereof; and a plurality of hole-section-side protrusions formed so as to project from an inner peripheral section of the hole-section body, in a state in which the shaft-section-side protrusions intrude into the hole-section body, the hole-section-side protrusions facing the shaft-section-side protrusions about the central axis line and interfering with the shaft-section-side protrusions, whereby the relative rotation of the fitting shaft section with respect to the adapter is regulated, and wherein a shaft-section-side inclined surface which is inclined toward a pull-out direction side is formed at an end section of the shaft-section-side protrusions, the end section facing a leading end side of the shaft-section body, and the guide section is configured so as to include the shaft-section-side inclined surface, and
    wherein an engagement section is formed in the adapter, the engagement section regulating the rotation of the adapter in the take-up direction as a result of a surface of the engagement section facing the take-up direction being interfered with by a stopper that is provided so as to be attachable to and removable from the adapter and the housing.

2. The webbing take-up device of claim 1, wherein a hole-section-side inclined surface which is inclined toward the take-up direction side is formed at an end section of the hole-section-side protrusions, the end section facing an opening end side of the hole-section body, and the guide section is configured so as to include the hole-section-side inclined surface.

3. The webbing take-up device of claim 1 further comprising a one-end-side member which is integrally provided at the spool body at the one end section in the axial direction, the fitting shaft section being formed to protrude from one end side in the axial direction of the one-end-side member, and another end side in the axial direction of the one-end-side member being fixed to the spool body.

4. The webbing take-up device of claim 1 further comprising a one-end-side member which is integrally provided at the spool body at the one end section in the axial direction, the fitting shaft section being formed to protrude from one end side in the axial direction of the one-end-side member, and another end side in the axial direction of the one-end-side member being fixed to the spool body.

5. The webbing take-up device of claim 1, wherein when the leading end side of the fitting shaft section intrudes into the fitting hole section in the state in which the phase of the fitting shaft section diverges from the phase of the fitting hole section, the shaft-section-side inclined surface presses the hole-section-side protrusions in the pull-out direction about the central axis line of the spool body and in the axial direction of the spool body.

6. A webbing take-up device comprising:
- a spool, including a spool body to which a proximal end side in a longitudinal direction of a long-belt-like webbing belt is connected and which takes up the webbing belt from the proximal end side thereof by rotation of the spool body in a take-up direction that is one direction about a central axis line of the spool body, a fitting shaft section being provided at the spool body at one end section in an axial direction of the spool body, the fitting shaft section being coaxial and integral with the spool body;
- an adapter provided at a lateral side of the one end section in the axial direction of the spool body, the adapter including a fitting hole section into which the fitting shaft section can be fitted in a state in which a phase of the fitting hole section matches a phase of the fitting shaft section about the central axis line, relative rotation of the adapter with respect to the fitting shaft section about the central axis line being regulated in a state in which the fitting shaft section is fitted into the fitting hole section; and
- a spring assembly including a housing that is provided so as to face the one end section in the axial direction of the spool body along the axial direction of the spool body and that accommodates the adapter at an inner side thereof in a state in which an opening side of the fitting hole section of the adapter is externally exposed such that the housing supports the adapter rotatably about the central axis line, a spring being provided inside of the housing, one end of the spring being connected to the housing and another end of the spring being connected to the adaptor, an urging force of the spring in the take-up direction being increased by the adapter being rotated in a pull-out direction that is opposite to the take-up direction,
- wherein a guide section is provided on at least one of the adapter or the spool, the guide section pressing the adapter in the pull-out direction or the guide section being pressed by the fitting shaft section in the pull-out direction when a leading end side of the fitting shaft section intrudes into the fitting hole section in a state in which the phase of the fitting shaft section diverges from the phase of the fitting hole section, whereby, by a force of the pressing, the guide section causes the adapter to rotate relatively in only one direction with respect to the fitting shaft section in the pull-out direction to a rotational position at which the fitting shaft section can be fitted into the fitting hole section
- wherein the fitting shaft section includes: a shaft-section body which is coaxial with the spool body; and a plurality of shaft-section-side protrusions formed so as to project from an outer peripheral section of the shaft-section body with an interval therebetween about the central axis line, and the adapter includes: a hole-section body having an inner diameter dimension that is larger than an outer diameter dimension of the shaft-section body and which can accommodate the shaft-section body and the plurality of shaft-section-side protrusions at an inner side thereof; and a plurality of hole-section-side protrusions formed so as to project from an inner peripheral section of the hole-section body, in a state in which the shaft-section-side protrusions intrude into the hole-section body, the hole-section-side protrusions facing the shaft-section-side protrusions about the central axis line and interfering with the shaft-section-side protrusions, whereby the relative rotation of the fitting shaft section with respect to the adapter is regulated, and wherein a hole-section-side inclined surface which is inclined toward a take-up direction side is formed at an end section of the hole-section-side protrusions, the end section facing an opening end side of the hole-section body, and the guide section is configured so as to include the hole-section-side inclined surface, and
- wherein an engagement section is formed in the adapter, the engagement section regulating the rotation of the adapter in the take-up direction as a result of a surface of the engagement section facing the take-up direction being interfered with by a stopper that is provided so as to be attachable to and removable from the adapter and the housing.

7. The webbing take-up device of claim 6 further comprising a one-end-side member which is integrally provided at the spool body at the one end section in the axial direction, the fitting shaft section being formed to protrude from one end side in the axial direction of the one-end-side member, and another end side in the axial direction of the one-end-side member being fixed to the spool body.

8. The webbing take-up device of claim 6, wherein when the leading end side of the fitting shaft section intrudes into the fitting hole section in the state in which the phase of the fitting shaft section diverges from the phase of the fitting hole section, the hole-section-side inclined surface is pressed by the shaft-section-side protrusions in the pull-out direction about the central axis line of the spool body and in the axial direction of the spool body.

\* \* \* \* \*